I. MUNROE.
Shovel.

No. 160,343.  Patented March 2, 1875.

Witnesses
S. W. Piper
L. N. Heller

Isaac Munroe.
by his attorney.

UNITED STATES PATENT OFFICE.

ISAAC MUNROE, OF PEABODY, MASSACHUSETTS.

IMPROVEMENT IN SHOVELS.

Specification forming part of Letters Patent No. 160,343, dated March 2, 1875; application filed February 12, 1875.

*To all whom it may concern:*

Be it known that I, ISAAC MUNROE, of Peabody, of the county of Essex and State of Massachusetts, have invented an Improved Manufacture of Shovels for the use of Tanners; and do hereby declare the same to be fully described in the following specification and represented in the accompanying drawings, of which—

Figure 1:
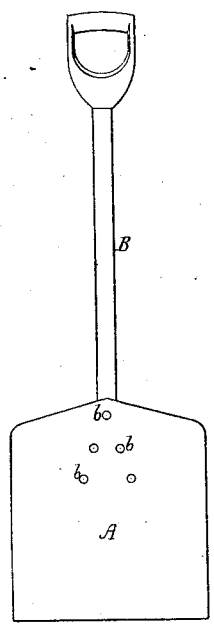
Figure 3:
Figure 2:
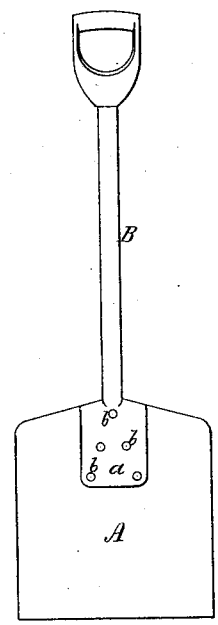

Figure 1 is a front view, Fig. 2 a back view, and Fig. 3 a longitudinal section, of one of such shovels.

It has a sheet-metal blade, A, and a wooden handle, B, provided with a wooden flat foot, $a$, to fit to the blade, and secured thereto by rivets $b\ b\ b$. The blade of sheet metal is to be struck into proper form by dies. The handle, with its foot, is in one piece of material, and of the form as represented, the foot being fitted to the back surface of the blade.

I am aware that it is not new to make a shovel with a metallic blade and a wooden handle inserted in a metallic socket or between straps projecting from the blade. Therefore I do not claim such. I am also aware that metallic handles and blades, and also wooden handles and wooden blades, are common to shovels.

My shovel is particularly adapted for the use of tanners in their tan-pits; also for shoveling snow from walks, and is not only more durable, but can be afforded cheaper than the wooden shovels as generally employed by them.

I claim—

As an improved manufacture, the shovel having a sheet-metal blade and a wooden handle furnished with a foot, and arranged with and fixed to said blade by rivets or fastenings, all as specified.

ISAAC MUNROE.

Witnesses:
R. H. EDDY,
J. R. SNOW.